United States Patent [19] [11] 4,123,561
Grant [45] Oct. 31, 1978

[54] METHOD FOR PROCESSING HOPS FOR BREWING

[75] Inventor: Herbert L. Grant, Yakima, Wash.

[73] Assignee: S.S. Steiner, Inc., New York, N.Y.

[21] Appl. No.: 764,600

[22] Filed: Feb. 1, 1977

[51] Int. Cl.² .................. C12C 9/02; C07C 45/00; C07C 49/00
[52] U.S. Cl. .................. 426/600; 260/586 D; 426/655
[58] Field of Search .............. 426/600, 651, 419, 444, 426/271, 655; 260/586 D

[56] References Cited

U.S. PATENT DOCUMENTS 3,765,903  10/1973  Clarke et al. ................ 426/600
3,952,061  4/1976   Koller et al. ................ 260/586 D

FOREIGN PATENT DOCUMENTS 959,073   12/1974  Canada ......................... 426/600
1,423,129  1/1976  United Kingdom ............. 426/600
1,424,785  2/1976  United Kingdom ............. 426/600
1,424,786  2/1976  United Kingdom ............. 426/600

*Primary Examiner*—Thomas G. Wiseman
*Attorney, Agent, or Firm*—Morgan, Finnegan, Pine, Foley & Lee

[57] ABSTRACT

There is provided a method of processing hops for brewing in which the hops and particularly the alpha acids in the hops are stabilized against deterioration, the process broadly comprising forming an intimate mixture of the hops or hop extracts with one or more oxides of a divalent metal or metals and maintaining the mixture under suitable conditions, preferably at an elevated temperature, e.g., 40°–100° C., until stabilization is substantially completed. In another aspect, the alpha acids present in the hops are converted to their isomerized products, which are desirable for brewing. The process is especially suitable for use in pelletizing operations.

29 Claims, 1 Drawing Figure

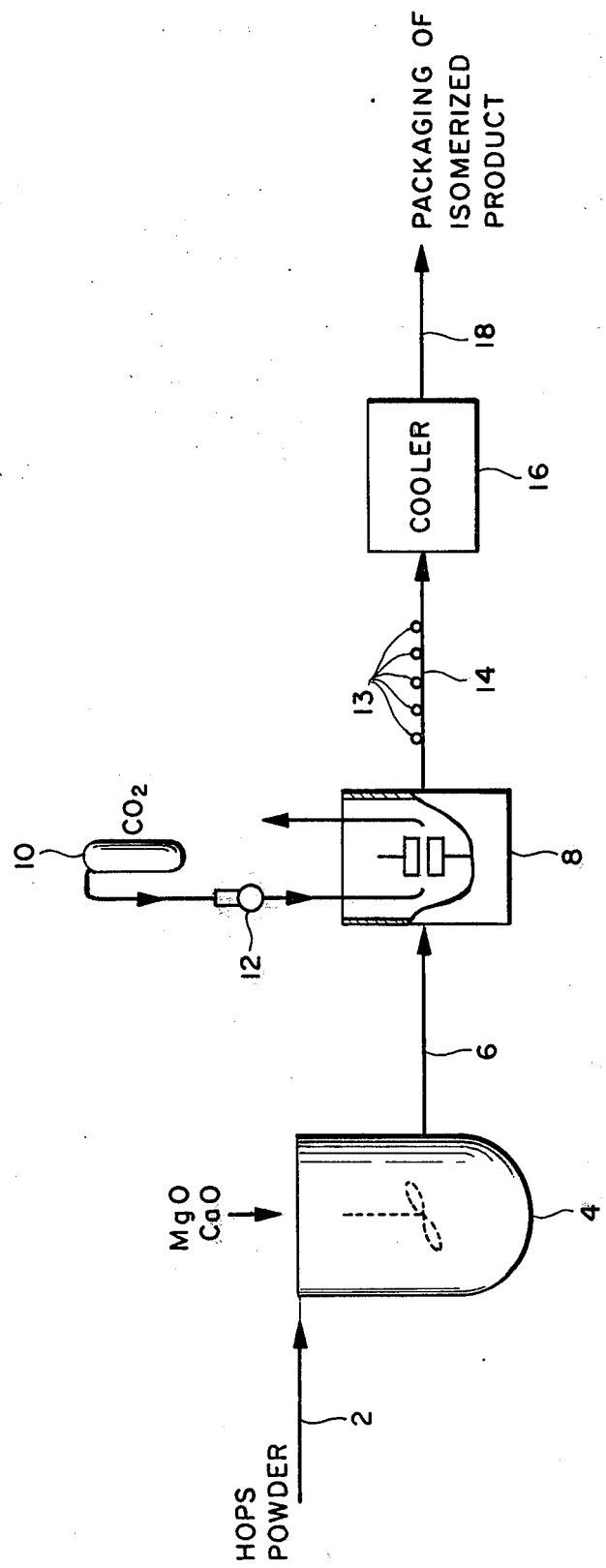

METHOD FOR PROCESSING HOPS FOR BREWING

BACKGROUND OF THE INVENTION

The present invention relates to a method for stabilizing the alpha acid or humulone content in hops prior to, during, and subsequent to the processing of hops for use in brewing. This invention also pertains to the isomerization of hops or hop extracts with good efficiency to obtain high yields of isomerized alpha acids which are useful as constituents in brewing.

The lupulin or humulin is the glandular trichomes of the strobiles of hops which are used for making various beverages. The lupulin contains two important constituents which are commonly used in brewing beer. These constituents are humulones, also referred to as alpha acids, and lupulones, sometimes referred to as beta acids. The humulones are the primary bitter constituent of the hops which are utilized in brewing beer.

Humulones or alpha acids tend to undergo isomerization forming isohumulones or iso-alpha acids. These isomerization products are desirable constituents in brewing and, thus, isomerization is a preferred process reaction. Isomerization typically is carried out intentionally in the brewing kettle.

Humulones are also subject to certain undesirable phenomena, however. Humulones tend to undergo deterioration and break down with undesirable by-products. For instance, under ambient conditions humulones or alpha acids have a tendency to oxidize and polymerize into hard resin. Moreover, during isomerization by-products may form, e.g., humulinie acids, which waste the humulone or alpha acid content of the hops. Another problem is the interreaction of humulones with other constituents in hops or hop extracts, such as lupulones or beta acids, under the stringent operating conditions of prior art processing methods.

The most simple method for preparing hops for use in brewing consists of introducing baled hops directly into the brewing kettle and brewing the mixture of malt, hops and water at the boiling temperature and at acidic, or lower, values of pH. During this procedure, the alpha acids present will isomerize. As a result of the aformentioned undesirable phenomena, however, this technique which is one of the oldest in the brewing business results in only a poor conversion of alpha acids to iso-alpha acids, i.e., in the order of only 25–35% isomerization of the alpha acids.

To prevent or at least ameliorate the deterioration of humulones or alpha acids and undesirable side reactions, most hops processing methods include steps which relate to (1) stabilizing the hops or hop extracts against the deterioration of alpha acids and (2) converting the alpha acids to isomerized alpha acids while minimizing the occurrence of side reactions and by-product formation. These methods have as objects increasing the amount or concentration of alpha acids available for isomerization and increasing the yield of isomerized alpha acids.

For instance, to protect the hops from deterioration, they are sometimes stored at reduced temperatures and/or under vacuum or in an inert atmosphere, e.g., nitrogen. This is an expensive procedure, however.

It has also been proposed to concentrate the alpha acids by separating them from the rest of the hops constituents and charging the concentrated alpha acids to the brewing kettle, e.g., Naatz, U.S. Pat. No. 2,833,652, Muller, U.S. Pat. No. 3,275,447, and Hokanson et al., U.S. Pat. No. 3,787,586, incorporated herein by reference. As a result of using a concentrated feed, the yield of isomerized alpha acids is higher. The process remains inefficient, however.

Still other techniques involve chemically treating separated alpha acids to convert them to iso-alpha acids prior to their addition to the brewing kettle. Such techniques are described in Clarke et al., U.S. Pat. No. 3,765,903 and Koller et al., U.S. Pat. No. 3,952,061. In general, these processes relate to the use of complicated procedures wherein the hops are first extracted with organic solvents and the solubilized hop extract containing alpha acids is then treated with alkali to convert the alpha acids present to their isomerized form. Using this technique, conversions of 80–85% of the recovered alpha acids to iso-alpha acids have been reported.

A shortcoming of these procedures, however, is the difficulty encountered with recovering both the non-isomerized and isomerized alpha acids from the organic solvent. Thus, while the alpha acids may undergo an 80–85% conversion to the isomerized products, as much as 30% or more of the alpha acids, based on the amounts originally present, can remain unrecovered and lost. Moreover, the use of solvent extraction is an expensive procedure.

Other methods have also been proposed, such as the well-known technique of treating the lupulin glands with methylene chloride, after grinding, which tends to separate and concentrate the alpha acids from the rest of the hops so as to yield more of the desired starting material for subsequent use in brewing.

The present invention overcomes many of the shortcomings of the previously known methods for stabilizing hops and obtaining high yields of isomerized product. Some of the advantages of this invention include: compatibility with previously known procedures for processing hops in brewing; stabilization of alpha acids in hops to prevent or sharply reduce deterioration thus resulting in greater economy in storage and packaging, as well as longer shelf life; and the avoidance of large amounts of organic solvents, which are expensive and toxic and result in a loss of alpha acids in recovery from the solvent.

In addition to stabilizing the alpha acid content of hops against deterioration, the method of this invention enables hops to be isomerized at faster reaction rates, under mild reaction conditions, with fewer losses of alpha acids to side reactions, thus yielding higher conversions of the alpha acids to the desired isomerization products.

DESCRIPTION OF THE INVENTION

In accordance with the present invention, there is provided a method for processing hops under conditions which stablize the humulone or alpha acid content against deterioration and enables these constituents to be more efficiently utilized. The method of the present invention comprises the steps of:

(i) mixing hops or hop extracts containing alpha acids with one or more metallic oxides wherein the metal is divalent and suitable for use in food products, so as to intimately contact the oxide material with the alpha acids present in the hops; and (ii) maintaining this mixture under suitable reaction conditions to enable the hops and alpha acids to become stabilized.

In addition to stabilizing the hops and alpha acids against deterioration, the above process may be used to convert the alpha acids to isomerized products.

Within the process as broadly described above, it has been found advantageous to use as the metallic oxide admixed with the hops or hop extracts, calcium oxide, magnesium oxide or a mixture of calcium oxide and magnesium oxide.

It is also preferred to use elevated temperatures in carrying out the process, in order to shorten stabilization reaction times and to facilitate stabilization. For example, it has been found that the reaction reaches sufficient conclusion after about 25-30 minutes where the blend of hops and metallic oxides are heated to a temperature in the range from about 70° to about 90° C. and the heat source is removed as soon as the hops reach that temperature.

Other temperatures can be employed, with reaction times being varied accordingly. It is within the skill of those in the art to optimize or vary these conditions in accordance with known reaction kinetics principles.

Unlike prior art techniques which involve the solubilization of hops in organic solvents, the present method avoids the need for carrying out isomerization of the alpha acids or humulones in solution in an organic solvent. The present method also does not require the use of harsh alkali treatments of the alpha acids in aqueous media, as are employed in some prior art methods. Instead, in accordance with the method of this invention, a blend is formed of the hops and oxide additives, e.g., magnesium oxide or calcium oxide, and isomerization occurs in situ under mild conditions such as room temperature, or more preferably, slightly elevated temperatures.

It has been surprisingly found that with the use of the oxide materials of this invention, the moisture or water naturally present in hops, typically from about 6 to about 15% by weight, is sufficient to cause a transformation in most of the alpha acids present to their isomerized form, i.e., isoalpha acids. If desired, it has been found that the rate of this reaction can be increased by the addition of a small amount of a lower alkanol of from about 1 to about 6 carbon atoms, e.g., methanol, ethanol, propanol, or the like, or a mixture of any of these. The alkanol can be added to the blend before or during mixing. Amounts of from about 5 to about 15% by weight of alkanol, based on the weight of the hops, are preferred.

It is to be noted that only relatively small amounts of alkanol are contemplated which are far short of the amounts required to solubilize the hops and metal oxides employed. Moreover, the alkanol need not be extracted or otherwise separated from the final stabilized product and, in most cases, substantially all of the alkanol will evaporate during processing.

Without wishing to be bound by any theory of the invention, it is believed that a protective metal salt or salts of the alpha acids or humulones is formed due to the presence of the divalent metallic oxide. These protective salts are more resistant to deterioration than the alpha acids from which they are derived. Also formed in situ is the isomerized product of the alpha acid salt.

The isomerization of the protective salts of the alpha acids yields surprising and unusual results. It has been found, for instance, that when the alpha acid salts are isomerized, the conversion reaction is highly selective in that very little by-product formation from side reactions, such as the formation of humulinic acids, occurs.

Moreover, in carrying out the isomerization under the mild process conditions of this invention, very little interaction between the alpha acids and other hops constituents, e.g., beta acids or humulones, takes place. This is in contrast to prior art methods which require relatively harsh process conditions.

The results obtained with the present invention show that an 80% or more conversion of the starting alpha acids to the isomerized products occurs. An important aspect of this invention is that only a relatively small amount of the alpha acids will be lost or remain unrecoverable. It is also noted that of those amounts of alpha acid which are not isomerized during the present process, a substantial amount will ultimately be converted in the brewing kettle. Thus, this invention enables a very high degree of efficiency in the use of the alpha acids originally contained in the starting material.

BRIEF DESCRIPTION OF THE DRAWING

The drawing is a schematic diagram of a preferred embodiment according to the method of this invention.

DETAILED DESCRIPTION OF THE PREFERRED EMBODIMENT

The present invention is especially suitable for use in the pelletizing of hops in preparation for brewing and it can be integrated readily into pelletizing operations, using conventional equipment.

By way of illustration, with reference to the accompanying drawing, hops powder containing alpha acids and beta acids are obtained from hops. The hops may be processed by any number of known techniques to form a hops powder containing the alpha acids either in a concentrated form or in combination with the other constituents of the hops. For example, hops powder may typically contain about 9% by weight of alpha acids when formed from a standard hammermill or grinding step. When a concentration technique is carried out, such as is described in the above mentioned Naatz or Hokanson et al. patents, the hops powder can contain as much as 21% by weight or more of alpha acids. In either case, the hops powder also typically contains from about 6 to about 15% by weight of water.

A typical oxide additive for use in this process is a mixture of equal proportions of calcium oxide and magnesium oxide in a total amount of 1-3% by weight of the hops powder. It is introduced into blender 4 and the contents of the blender are thoroughly and intimately mixed until a uniform, consistent blend is obtained. If desired, a small amount, e.g., 5-15% by weight, of a lower alkanol, e.g., methanol, ethanol, propanol, or the like, can also be placed into the blender and mixed with the hops powder and metallic oxides. After blending, the mixture is fed through conduit 6 into pellet press 8, where pressure is briefly applied and the blend is thereby compressed into tablets or pellets. During pellet formation, heat is generated to the extent that the temperature is permitted to rise to about 75° C. for a few seconds prior to removing the pellets from the press. General pelletizing techniques recommend controlling the heat generated during pelletization. That same control to limit deterioration of hops constituents is not necessary in the process of the present invention.

If desired, carbon dioxide can be fed in a continuous stream from pressurized cylinder 10 through regulating pump 12 into press 8 so as to form a blanket of the gas above the pellet die, and a flushing stream below the pellet die, during pellet formation. During the pelletizing operation, isomerization of the alpha acids in the hops powder begins to occur.

The pellets 13 are removed from pellet press 8 on continuous moving belt 14 to cooler 16. The moving belt may be insulated to allow the pellets to maintain their elevated temperature for a sufficient time to enable isomerization to continue to completion. Such variables as to temperature of the pellets, rate of heat loss and rate of movement of belt must be considered in choosing the optimum apparatus and process conditions. After the desired degree of reaction is obtained, the pellets are transferred to cooler 16. The cooled pellets emerge from cooler 16 on conveyor belt 18 and are carried away from packaging.

By means of this process, in the order of 80% or more by weight of the alpha acids present in the hops powder prior to treatment are converted to the desired iso-alpha acids, with no appreciable losses of alpha acids or iso-alpha acids during processing.

The method of this invention can also be carried out using other techniques of processing hops for brewing. For example, after forming an intimate blend of hops powder and magnesium and/or calcium oxides, optionally including minor amounts of an alcohol, e.g., methanol, the blend can be moderately heated, e.g., to a temperature of from about 40° to about 100° C., maintained at that temperature for a brief period, e.g., from about 5 to 60 minutes while isomerization takes place, and then cooled to room temperature.

Other modifications and variations of this invention will occur to those skilled in the art in the light of the above description. It is to be understood, therefore, that changes may be made in the particular embodiments described herein which are within the full intended scope of the invention as defined in the appended claims.

I claim:

1. A method for processing powdered hops which stabilizes the hops and the alpha acids present against deterioration, said method comprising the steps of:
   (i) mixing a hops powder or hops powder concentrate, said powder or powder concentrate containing alpha acids, with one or more oxides of a divalent metal suitable for use in food products, so as to intimately contact said metal oxide with the alpha acids under conditions insufficient to form a solution; and
   (ii) maintaining said mixture of hops powder or powder concentrate and metal oxide under suitable reaction conditions to enable said hops powder or powder concentrate and said alpha acids to become stabilized.

2. The method of claim 1 wherein said hops powder has been formed by grinding hops.

3. The method of claim 1 wherein said metallic oxide is present in an amount of from about 1 to about 3% by weight of the hops powder.

4. The method of claim 1 wherein in step (ii), the mixture of hops powder or powder concentrate and metal oxide is kept at an elevated temperature above room temperature.

5. The method of claim 4 wherein in step (ii), the mixture of hops powder or powder concentrate and metal oxide is kept at an elevated temperature above room temperature and under a pressure at least sufficient to compress said mixture into pellets.

6. The method of claim 4 wherein said elevated temperature is in the range of from about 40° to about 100° C.

7. The method of claim 1 wherein said metallic oxide is selected from calcium oxide, magnesium oxide or a mixture thereof.

8. The method of claim 1 wherein a small amount of a lower alkanol, insufficient to form a solution of the hops powder or powder concentrate, is also admixed in step (i).

9. The method of claim 8 wherein said lower alkanol is selected from methanol, ethanol, propanol or a mixture thereof.

10. A method for isomerizing the alpha acids contained in powdered hops, said method comprising the steps of:
    (i) mixing a hops powder or hops powder concentrate, said powder or powder concentrate containing alpha acids, with one or more oxides of a divalent metal suitable for use in food products, so as to intimately contact said metal oxide with the alpha acids under conditions insufficient to form a solution; and
    (ii) maintaining said mixture of hops powder or powder concentrate and metal oxide under suitable reaction conditions to enable the isomerization of said alpha acids to occur.

11. The method of claim 10 wherein said hops powder has been formed by grinding hops.

12. The method of claim 10 wherein said metallic oxide is present in an amount of from about 1 to about 3% by weight of the hops powder.

13. The method of claim 10 wherein in step (ii), the mixture of hops powder or powder concentrate and metal oxide is kept at an elevated temperature above room temperature.

14. The method of claim 13 wherein in step (ii), the mixture of hops powder or powder concentrate and metal oxide is kept at an elevated temperature above room temperature and under a pressure at least sufficient to compress said mixture into pellets.

15. The method of claim 13 wherein said elevated temperature is in the range of from about 40° to about 100° C.

16. The method of claim 10 wherein said metallic oxide is selected from calcium oxide, magnesium oxide, or a mixture thereof.

17. The method of claim 10 wherein a small amount of a lower alkanol, insufficient to form a solution of the hops powder or powder concentrate, is also admixed in step (i).

18. The method of claim 17 wherein said lower alkanol is selected from methanol, ethanol, propanol, or a mixture thereof.

19. A method for forming a pelletized hops powder containing isomerized alpha acids, said method comprising the steps of:
    (i) mixing a hops powder or hops powder concentrate, said powder or powder concentrate containing alpha acids, with one or more oxides of a divalent metal suitable for use in food products, so as to intimately contact said metal oxide with the alpha acids under conditions insufficient to form a solution;
    (ii) shaping said mixture from step (i) under a pressure at least sufficient to compress said mixture into pellets wherein sufficient heat is generated to accelerate the isomerization reaction of the alpha acids in said hops powder or powder concentrate; and (iii) removing said pellets from under pressure and allowing the isomerization to proceed to completion.

20. The method of claim 19 wherein said hops powder has been formed by grinding hops.

21. The method of claim 19 wherein said metallic oxide is present in an amount of from about 1 to about 3% by weight of the hops powder.

22. The method of claim 19 wherein in step (ii), the temperature is in the range of from about 40° to about 100° C.

23. The method of claim 19 wherein said metallic oxide is selected from calcium oxide, magnesium oxide or a mixture thereof.

24. The method of claim 19 wherein a small amount of a lower alkanol, insufficient to form a solution of the hops powder or powder concentrate, is also admixed in step (i).

25. The method of claim 24 wherein said lower alkanol is selected from methanol, ethanol, propanol or a mixture thereof.

26. A method for processing powdered hops which stabilizes the hops powder and the alpha acids present against deterioration, said method comprising the steps of:

(i) mixing a hops powder or hops powder concentrate, said powder or powder concentrate containing alpha acids, with from about 1 to about 3% by weight, based on the weight of the powder or powder concentrate of a metallic oxide selected from the group consisting of calcium oxide, magnesium oxide, or a mixture thereof so as to intimately contact the oxide with the alpha acids under conditions insufficient to form a solution; and (ii) maintaining said mixture of hops powder and metallic oxide under suitable reaction conditions to enable said hops powder and said alpha acids to become stabilized.

27. A method for isomerizing the alpha acids contained in powdered hops, said method comprising the steps of:

(i) mixing a hops powder or hops powder concentrate, said powder or powder concentrate containing alpha acids, with from about 1 to about 3% by weight, based on the weight of the powdered hops of a metallic oxide selected from the group consisting of calcium oxide, magnesium oxide, or a mixture thereof so as to intimately contact the oxide with the alpha acids under conditions insufficient to form a solution; and (ii) maintaining said mixture of hops powder and metallic oxide under suitable reaction conditions to enable the isomerization of said alpha acids to occur.

28. The method of claim 27 wherein the hops have a moisture content of from about 6% to about 15% by weight.

29. A method for forming a pelletized hops powder containing isomerized alpha acids, said method comprising the steps of:

(i) mixing a hops powder or hops powder concentrate, said powder or powder concentrate containing alpha acids with from about 1 to about 3% by weight, based on the weight of the powdered hops of a metallic oxide selected from the group consisting of calcium oxide, magnesium oxide, or a mixture thereof so as to intimately contact the oxide with the alpha acids under conditions insufficient to form a solution;

(ii) shaping the mixture from step (i) under a pressure of at least sufficient to compress said mixture into pellets wherein sufficient heat is generated to accelerate the isomerization reaction of the alpha acids in said hops powder or powder concentrate; and (iii) removing said pellets from under pressure and allowing the isomerization to proceed to completion.

* * * * *